United States Patent
Mohan et al.

(10) Patent No.: US 12,306,921 B2
(45) Date of Patent: May 20, 2025

(54) AUTHORIZATION BETWEEN INTEGRATED CLOUD PRODUCTS USING ASSOCIATION

(71) Applicant: Oracle International Corporation, Redwood Shores, CA (US)

(72) Inventors: Mauruthi Geetha Mohan, Seattle, WA (US); Anthony Long, Edmonds, WA (US); Mina Michel Gorgy Anes, Bothell, WA (US); Sanjeeb Kumar Sahoo, Pleasanton, CA (US); Yingyu Yang, Bellevue, WA (US); Bakhtiyar Uddin, Leander, TX (US); Thomas James Andrews, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 372 days.

(21) Appl. No.: 17/963,134

(22) Filed: Oct. 10, 2022

(65) Prior Publication Data

US 2024/0119133 A1   Apr. 11, 2024

(51) Int. Cl.
 *G06F 21/33*    (2013.01)
(52) U.S. Cl.
 CPC .................................... *G06F 21/33* (2013.01)
(58) Field of Classification Search
 CPC .......................................................... G06F 21/33
 See application file for complete search history.

(56) References Cited

U.S. PATENT DOCUMENTS

| | | | |
|---|---|---|---|
| 8,549,300 B1 * | 10/2013 | Kumar | H04L 9/3263 713/168 |
| 9,584,328 B1 * | 2/2017 | Graham-Cumming | H04L 61/5007 |
| 2017/0171191 A1 * | 6/2017 | Cignetti | H04L 12/4625 |

* cited by examiner

Primary Examiner — Taghi T Arani
Assistant Examiner — Edward Estrada
(74) Attorney, Agent, or Firm — Kilpatrick Townsend & Stockton LLP

(57) ABSTRACT

Techniques described herein relate to authorization between integrated cloud products. An example includes receiving, by a computing device and from a first resource, a first request for permission to access a certificate to verify a requestor's identity. The computing device can transmit a second request to a second resource to authorize permitting access to the certificate. The computing device can receive a response from the second resource comprising an authorization to permit access to the certificate. The computing device can grant permission to the first resource to access the certificate, wherein the first resource is configured to verify the requestor's identity based on accessing the certificate. The computing device can receive a third request from the first resource to generate an association object between the first resource and the certificate. The computing device can generate the association object, wherein the association object associates the first resource and the certificate.

20 Claims, 13 Drawing Sheets

AUTHORIZATION BETWEEN INTEGRATED CLOUD PRODUCTS USING ASSOCIATION

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud services provider can offer on-demand services, such as a forecasting service.

BRIEF SUMMARY

The present embodiments relate to authorization between integrated cloud products using association. A first example embodiment can provide a computer-implemented method for authorization between integrated cloud products using association. The method can include receiving, from a first resource, a first request for permission to access a certificate to verify a requestor's identity.

The computer-implemented method can further include transmitting, based at least in part on the first request, a second request to a second resource to authorize permitting access to the certificate.

The computer-implemented method can further include receiving, based at least in part on the second request, a response from the second resource comprising an authorization to permit access to the certificate.

The computer-implemented method can further include granting, based at least in part on the response, permission to the first resource to access the certificate, wherein the first resource is configured to verify the requestor's identity based on accessing the certificate.

The computer-implemented method can further include receiving, based at least in part on the grant, a third request from the first resource to generate an association object between the first resource and the certificate.

The computer-implemented method can further include receiving generating, based at least in part on the third request, the association object, wherein the association object associates the first resource and the certificate.

A second embodiment can provide a computing device. The computing device can include a processor; and a computer-readable medium comprising instructions that, when executed by the processor, cause the processor to perform operations including receiving, from a first resource, a first request for permission to access a certificate to verify a requestor's identity.

The instructions that, when executed by the processor, cause the further processor to perform operations including transmitting, based at least in part on the first request, a second request to a second resource to authorize permitting access to the certificate.

The instructions that, when executed by the processor, cause the further processor to perform operations including receiving, based at least in part on the second request, a response from the second resource comprising an authorization to permit access to the certificate.

The instructions that, when executed by the processor, cause the further processor to perform operations including granting, based at least in part on the response, permission to the first resource to access the certificate, wherein the first resource is configured to verify the requestor identity based on accessing the certificate.

The instructions that, when executed by the processor, cause the further processor to perform operations including receiving, based at least in part on the grant, a third request from the first resource to generate an association object between the first resource and the certificate.

The instructions that, when executed by the processor, cause the further processor to perform operations including generating, based at least in part on the third request, the association object, wherein the association object associates the first resource and the certificate.

A third embodiment can provide a non-transitory computer-readable medium including stored thereon a sequence of instructions that, when executed by a processor, causes the processor to perform operations comprising receiving, from a first resource, a first request for permission to access a certificate to verify a requestor's identity.

The instructions that, when executed by the processor, cause the further processor to perform operations including transmitting, based at least in part on the first request, a second request to a second resource to authorize permitting access to the certificate.

The instructions that, when executed by the processor, cause the further processor to perform operations including receiving, based at least in part on the second request, a response from the second resource comprising an authorization to permit access to the certificate.

The instructions that, when executed by the processor, cause the further processor to perform operations including granting, based at least in part on the response, permission to the first resource to access the certificate, wherein the first resource is configured to verify the requestor identity based on accessing the certificate.

The instructions that, when executed by the processor, cause the further processor to perform operations including receiving, based at least in part on the grant, a third request from the first resource to generate an association object between the first resource and the certificate.

The instructions that, when executed by the processor, cause the further processor to perform operations including generating, based at least in part on the third request, the association object, wherein the association object associates the first resource and the certificate.

DETAILED DESCRIPTION

Figure 1:
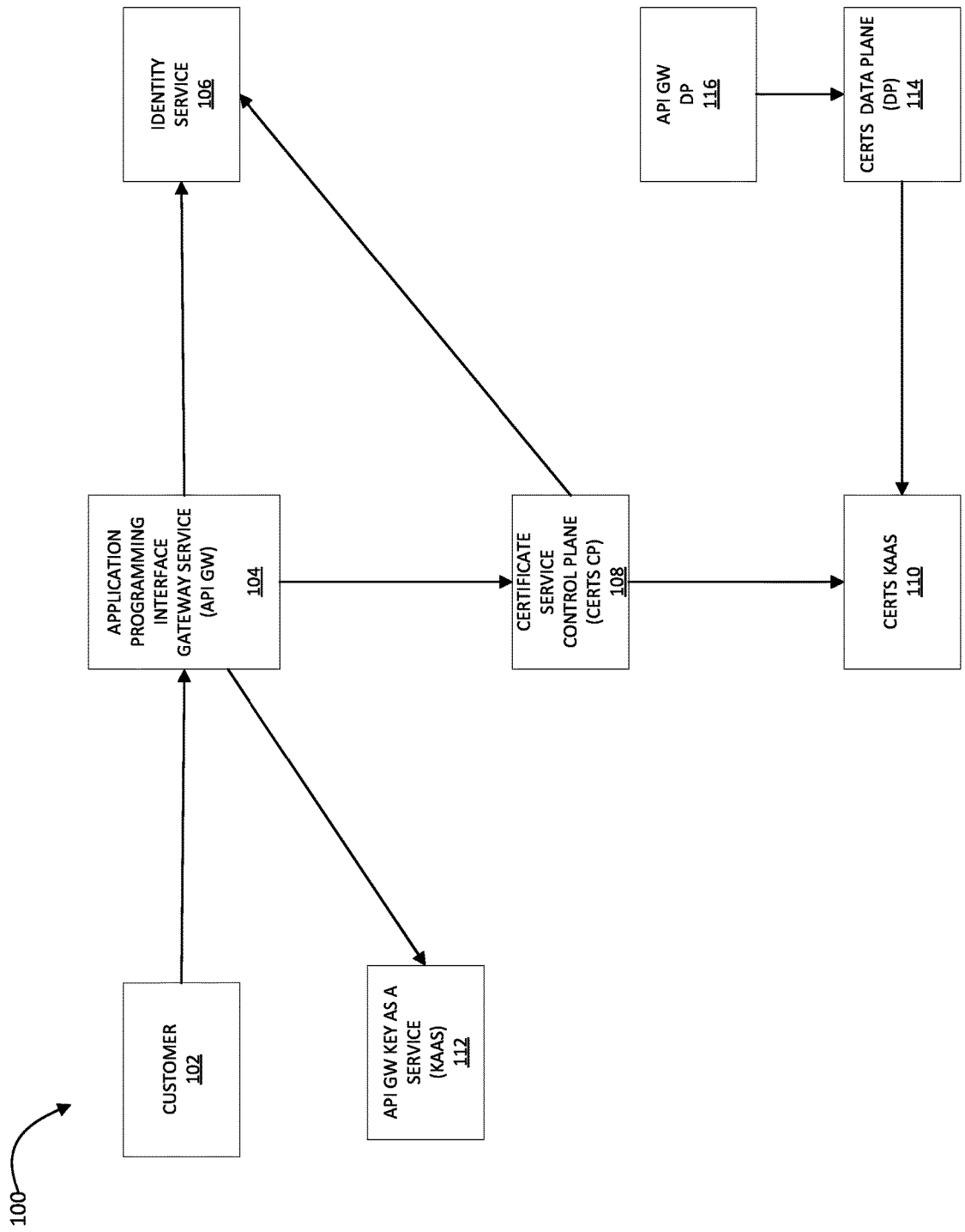
FIG. 1 is an illustration of a system for authorization using association between cloud resources, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud services provider (CSP) can use certificate-based authentication, in which a cloud computing resource can present a digital certificate to another cloud computing resource to request permission to access a resource (e.g., application, network, or data). A digital certificate can contain information describing an entity (e.g., customer) to which it has been issued. The digital certificate can include the entities, name, contact information, organization, domain name, public key, and a certificate issue and expiry date. The name of the issuing certificate authority (CA) and its digital signature can also be included in the digital certificate. The other cloud computing resource can use the digital certificate verify the identity of the requesting resource, and grant or deny access based on the verification.

An example certificate-based authentication can be as follows: a CSP customer can transmit a request to a first resource (e.g., load balancer (LB) service, application programming interface gateway (API GW) service) for the first resource to perform some action (e.g., create a load balancer instance, create an API GW). The first resource can receive the request and transmit a request to a second resource (e.g., certificate service) to retrieve a certificate associated with the customer to authenticate the customer's identity to make the request. The second resource can be configured to protect the certificate from unauthorized access. The second resource can transmit a message to a third resource (e.g., identity service) to retrieve a policy as to whether the second resource can allow the first resource to read the certificate associated with the customer. The third resource can, based on the policy, provide an indication as to whether the second resource can allow the first resource to read the certificate. If the policy indicates that the second resource can allow the first resource to read the certificate, the third resource can transmit an indication that the first resource can read the certificate. If, however, either the policy does not permit the first resource to read the certificate, or the policy is non-existent, the third resource can transmit a message to the second resource, that the first resource cannot read the certificate. The CUSP can further generate new certificates for its customers, renew certificates for its customers, and revoke certificates for customers that are no longer using the CSP's services.

On the CSP customer side, the CSP customer can use a certificate service to create the certificate, which the first resource (e.g., LB service, API GW service) can use to authenticate a request from a the CSP customer. The certificate can further be stored by the second resource (e.g., certificate service). The CSP customer can transmit a first set of control instructions to the first resource that the certificate can be used to authenticate a request from the customer to use the first resource (e.g., create a load balancer instance, create an API GW). The CSP customer then can also transmit a second set of control instructions to the third resource (e.g., an identity service), including a policy, that the second resource can allow the first resource to read the certificate to authenticate a request from the CSP customer.

In practice, customers can have issues transmitting the second set of control instructions as they seem like a duplication of the first set of control instructions. In particular, CSP customers can neglect to create and transmit the second set of control instructions to the third cloud resource or create and transmit the second set of control instructions and then inadvertently revoke the instructions.

In practical applications, neglecting to transmit the second set of control instructions can be problematic. For example, the customer can transmit a first message to the first resource to use the first resource. The first resource, in response to the first message, can transmit a second message to the second resource (e.g., certificate service) for a certificate (fourth resource) to verify the identity of the customer. The certificate service can be configured to request a policy from a third resource (e.g., identity service) to verify that the first resource can read the certificate. If the customer never provided the second set of control instructions, including the policy, to the third resource, the third resource may not indicate to the second resource, that the first resource can read the certificate. As a result, the first resource cannot read the certificate stored by the second resource and cannot verify the identity of the customer. If the first resource cannot read the certificate, it can further fail to fulfill the customer's request.

Embodiments described herein address the above referenced issues by providing a methodology for creating an association object that associates a resource (e.g., load balancer) with another resource (e.g., certificate stored by a certificate service). The association object can obviate the customer having to create and the policy specifying a certificate service can release a certificate to a particular resource. As a result, the resource (e.g., load balancer) can access the other resource (e.g., the certificate) without a policy-based verification that it has permission to access the other resource. Therefore, the customer can avoid having to write the policy and store it in a cloud network. Or if the customer mistakenly deletes/revokes a previously written policy, the resource (e.g., identity service) can still access the other resource (e.g., the certificate) based on the association object.

As an example, a customer can use a certificate service to create a certificate for permitting a load balancer service to authenticate a request from the customer. It should be appreciated that the following example uses a load balancer, a certificate service, and identity service as example resources, and that the embodiments described herein can be applied to various resources. The customer can transmit a first set of control instructions to the load balancer service to create a load balancer instance and that the certificate can be used to authenticate the customer's identity. In response to receiving the first message, the load balancer service can transmit a second message to the certificate service to request to read the certificate. The certificate service can verify that the load balancer can read the certificate. The certificate service can further create an association object between the load balancer service and the certificate. The association object can be an object (e.g., second level object) that connects a certificate service object (e.g., top level object such as a certificate authority, certificate authority bundle, or certificate) with a resource (e.g., load balancer service).

It should be appreciated as described herein, the embodiments generally can relate to integrated services including a load balancer service and an API gateway service for illustration. Furthermore, the embodiments described here can relate to other services. For example, an object service can use the functionality described herein to authorize the encryption of customer data at rest using a key management service (KMS) managed key. Another example is that a data science product can use the functionality described herein to authorize a notebooks integration with a virtual network interface case (VNIC). Even another example is that a domain name system (DNS) can use the functionality described herein to authorize one DNS zone to manage another DNS for which it has a canonical name (CNAME) record. Yet even another example is that a server can use the functionality described herein to authorize the deliver y of keys to another resource.

Therefore, the load balancer service can receive a request from the customer at some later point in time. The load balancer service can send a request to the certificate service to read the certificate associated with the customer. The certificate service can grant access to read the certificated, based on the certificate service created association, and without having to request a customer created policy from the identity service. In this sense, the customer can avoid transmitting the policy to the identity service, and also avoid an issue where a policy is inadvertently revoked or deleted.

Through the use of association objects, customers can determine which resources are associated with which certificates, to better manage their certificates. Customers can further use association object information to prevent deleting or revoking the wrong certificates. It should be appreciated that although the above uses resource examples, such as job scheduler, load balancer, key service, and identity service, the herein described embodiments can relate to various scenarios in which a first resource can access a second resource based on an association object rather than a policy.

FIG. 1 is an illustration of a system 100 for authorization using association between cloud resources, according to one or more embodiments. A customer 102 can transmit a request to an integrated service (e.g., API GW service 104) to perform an action. For example, the customer 102 can transmit a request to the API GW service 104 to create an API GW instance. The request can further include a certificate identifier for a certificate to be used to verify the customer's identity to make the request. The API GW service 104 can make a call to an identity service 106 to request authorization for creating the API GW instance. The request can include the certificate identifier for a certificate associated with the customer. For example, the certificate can be the certificate with respect to API GW service 104 and created by the customer using the certificate service. The identity service 106 can be a service that verifies user identities to access to resources, such as files, applications, and services.

In response, the identity service 106 can either grant or deny authorization for the request. In some instances, the identity service can grant authorization and transmit a response that includes a token to initiate creating the API GW instance. The token can be used to present to a certificate service to authorize retrieval of the certificate. The token can be an on-behalf-of (OBO) token, which can be used when a customer invokes a service or API, and that service or API needs to call another service to satisfy a customer request. In other instances, the identity service 106 can deny authorization to the API GW service 104. The decision as to whether to grant or deny authorization can be based on various parameters, verifying an identity of the API GW service 104, system performance metrics, available tokens, or other appropriate metrics. It should be appreciated that although FIG. 1 uses an API GW as an example, the concepts can be applied to various integrated cloud services (e.g., load balancing service).

The API GW service 104 can also call a certificate service control plane (CertS CP) 108 using the token to request to access the certificate to verify whether the customer is authorized to create an API GW instance against the certificate and/or whether any such certificate exists (e.g., the certificate has not been previously revoked). The CertS CP 108 can read the token and either authorize or deny the API GW service 104 request to read the certificate against the token. The authorization or denial can be based on whether the token is directed to the API GW service 104 and the certificate. In the event that the CertS CP 108 grants the request, the API GW service 104 can read the certificate stored by the CertS CP 108 and verify that the customer identity to request creation of the API GW. Based on the verification, the API GW service 104 can further call the CertS CP 108 create an association object to associate the certificate and the API GW service 104. As described above, the association object can be an object that connects the certificate with the API GW service 104.

The CertS CP 108 can call the identity service 106 to request authorization to create the association object, in view of the token and certificate identifier. The identity service 106 can transmit an authorization or denial to create the association object to the CertS CP 108. The identity service 106 can determine whether to authorize or deny authorization to create the association object based on the certificate identifier matching the token (e.g., OBO token). The CertS CP 108 can create the association object based on the authorization from the identity service 106. The CertS CP 108 can further store the association object in a CertS (CertS KaaS) 110. As used herein KaaS can include a server that supports a service. For example, the KaaS can be a server that provides services for a certificate/key/value storage service. The API GW service 104 can store the certificate identifier in an API GW KaaS 112. The API GW service 104 can then proceed to create the API GW instance, pursuant to the request of the customer 102.

A CertS data plane (DP) 114 can read the association object stored in the CertS KaaS 110 and replicate the association object. The CertS DP 114 can further store and encrypt the certificate. Therefore, if the API GW service 104 needs to read the certificate (e.g., based on a new request from the customer 102), an API GW DP 116 can read the certificate using a private key provided by the CertS DP 114 based on the association object. In this sense, the API GW service 104 can access the certificate to verify the identity of the customer 102 based on the CertS created association object, rather than a customer created policy stored in the identity service 106. Therefore, even if the customer 102 neglects to create a policy or revokes the policy, the API GW service 104 can still verify the identity the customer 102 based on the association object.

For example, once the association object is created, the customer 102 can submit a new request for another API GW instance, or the API GW service 104 can be configured to need to renew verification of the customer's identity. In these cases, the API GW DP 116 can bypass calling the identity service 106 for a policy and read the certificate stored by the CertS DP 114 based on the association object. The API GW DP 116 can transmit a request to the CertS DP 114 to read a certificate associated with the customer 102 and the API GW service 104. The CertS DP 114 can read the association object and determine that the certificate is associated with the API GW service 104. Based on the association object, the CertS DP 114 can permit the API GW DP 116 to read the certificate. Therefore, the API GW service 104 can continue to access the certificate without the customer 102 having to write a policy and store it with the identity service 106.

The authorization to create an association object can be managed by the CSP. For example, the CSP can authorize the creation of an association object by a cloud computing node at the request of a customer. The CSP can further prohibit a customer from creating an association object but permit the customer to view each association object associated with the customer. By allowing the customer to view each association object, the customer can manage each association object and determine when to new or revoke certificates associated with the association objects.

In practical applications, one issue that can arise for a customer and a CSP is the expiration of a certificate. In the event that a certificate expires, a customer can experience service outages. To prevent a service outage, a certificate can be renewed prior to expiration. A certificate can be renewed based on a manual input from a customer or through an automated process. Therefore, embodiments described herein relate to permitting a customer to set up rules for automatically renew their certificates. In the event that a certificate is renewed, an association object can be used to permit a cloud resource (e.g., LB service, API GW service) to read the renewed certificate stored by another cloud resource (e.g., CertS DP), and without the customer having to write a policy to redirect the cloud resource to the renewed certificate.

Referring back to FIG. 1, in response to the CertS CP 108 renewing a certificate, a cloud computing system can generate an event, such as a certificate renewal event. The event can be a data structure that is used as notice to other cloud computing nodes that a certificate has been renewed. A cloud resource, such as CertS KaaS 110, can create and further store the event. The CertS KaaS 110 can further generate a sequence number for each event, where each sequence number has an incrementally increasing value from a previous certificate. For example, if an event has a sequence number of 0000, a subsequent renewal event can have a sequence number of 0001. Therefore, a cloud resource can read the event sequence number and compare the number to a last known number for a certificate to determine whether the certificate is a renewed certificate.

The event can further be replicated and stored by another resource, such as in the CertS DP 114. A cloud resource needing to verify an identity can retrieve the stored event using an internal API. Based on the sequence number of retrieved event, the cloud resource can determine that a renewed certificate has been created. The cloud resource can then verify the customer's identity based on the renewed certificate, and without an interruption of service.

Figure 2:
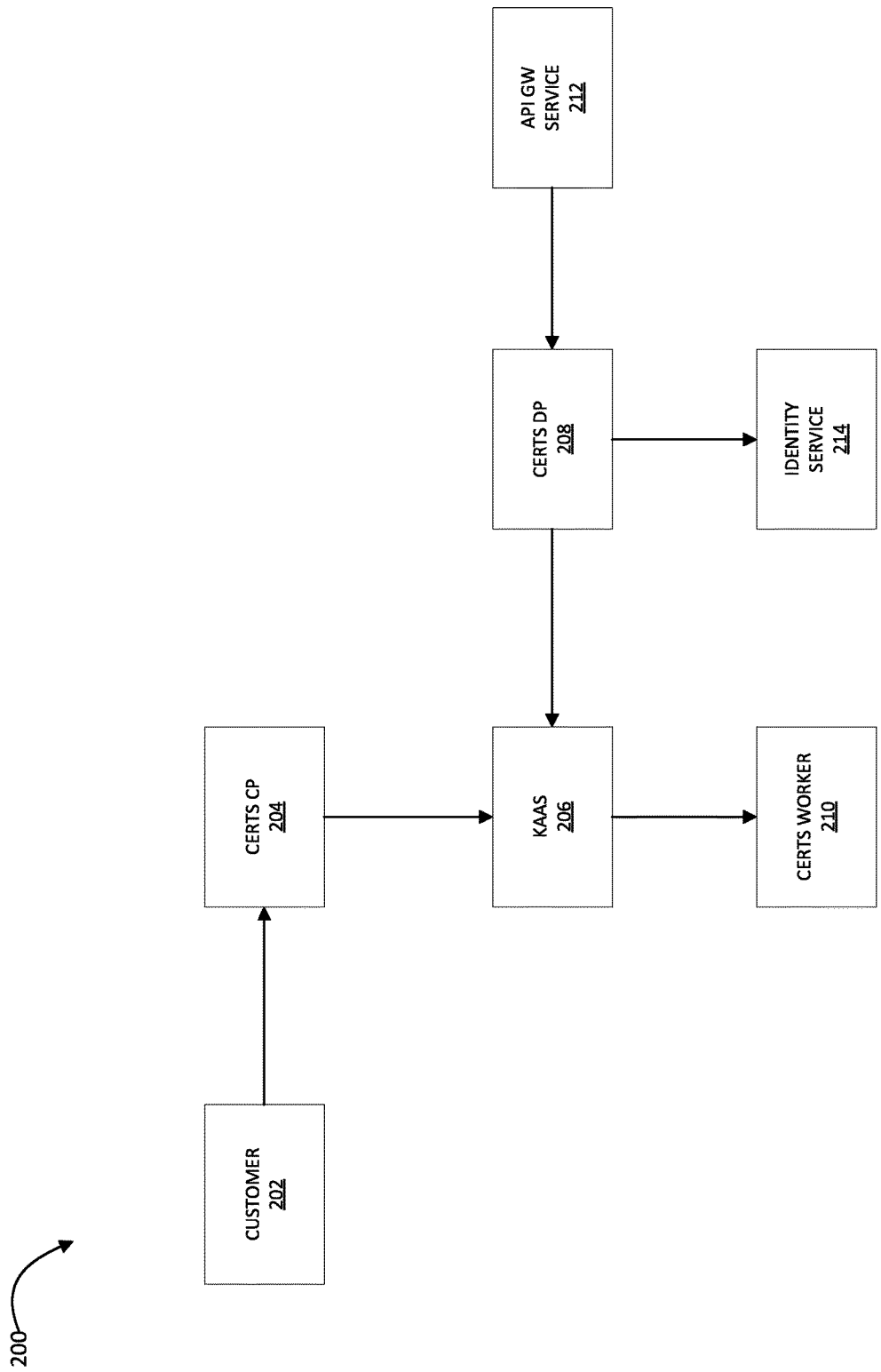
FIG. 2 is an illustration of a system for authorization using association between cloud resources, according to one or more embodiments.

FIG. 2 is an illustration of a system 200 for authorization using association between cloud resources, according to one or more embodiments. In particular, FIG. 2 can be directed to a certificate renewal process, according to one or more embodiments. As illustrated, a customer 202 can enter a manual input to renew a certificate. It should be appreciated that the certificate renewal process can also be initiated by an automated process. It should further be appreciated that although FIG. 2 uses an application programming interface gateway (API GW) as an example, the concepts can be applied to various integrated cloud services (e.g., load balancing service). A customer 202 can transmit a request to renew a certificate to a CertS CP 204. The CertS CP 204 can receive the request and initiate a workflow to renew a certificate. The CertS CP 204 can further associate the association object that was associated with the previous certificate with the renewed certificate. The KaaS 206 can retrieve the renewed certificate from the CertS CP 204. The KaaS 206 can further store the renewed certificate.

A CertS DP 208 can read the renewed certificate in the KaaS 206 to replicate and store the renewed certificate and association object. A CertS worker 210 can monitor the KaaS 206 to determine when the CertS DP 208 completes replicating the renewed certificate. The CertS worker 210 can be a physical or virtual machine that can execute containerized applications and manage network communications. The CertS worker 210 can create a renewal event based on determining that the CertS DP 208 has completed replicating the certificate and the association object. The renewal event can be associated with a sequence number that is incrementally higher than a sequence number associated with an event associated with the previous certificate. The KaaS 206 can retrieve the renewal event and sequence number from the CertS DP 208 and store both the renewal event and sequence number.

At some point, an API GW service 212 can receive a request from a customer, in which the API GW service 212 can verify the customer's identity to determine whether to satisfy the request. The API GW service 212 can poll the CertS DP 208 to determine if any renewal events have been added to the CertS DP 208. The CertS DP 208 can transmit a response to the API GW 212 that a renewal event has been added to the CertS DP 208. The API GW service 212 can transmit a message to the CertS DP 208, including a request to read the renewed certificate.

The CertS DP 208 can receive the request from the API GW service 212 and transmit a message to an identity service 214 for authorization to permit the API GW service 212 to read the renewed certificate. The identity service can either grant or deny an authorization to permit the API GW service 212 to read the renewed certificate. If the identity service 214 authorizes the CertS DP 208 to allow the API GW service 212 to read the renewed certificate, the CertS DP 208 can permit the API GW service 212 to read the certificate. If, however, the identity service 214 denies authorization to the CertS DP 208 to allow the API GW service 212 to read the renewed certificate, the CertS DP 208 can deny permission to the API GW service 212 to read the certificate. The identity service 214 can make the determination based on verification of an identity of the CertS DP 208.

In addition to renewing a certificate, embodiments described herein can be directed toward revoking a certificate. FIG. 2 can also be directed toward a process for revoking a certificate, according to one or more embodiments. A customer 202 can transmit a request to revoke a certificate to a CertS CP 204. The certificate can be associated, via an association object, with a resource (e.g., LB service, API GW service). The CertS CP 204 can receive the request and initiate a workflow to revoke the certificate, where revoking a certificate includes revoking any subordinate certificates (e.g., intermediate certificates). The CertS CP 204 can revoke the certificate, based on the customer's request.

A KaaS 206 can detect the revocation and store an indication, such as metadata, that the certificate has been revoked. A CertS DP 208 can read the revocation indication stored in the KaaS 206 to initiate revocation of any replicated certificate, including any subordinate certificates. A CertS worker 210 can monitor the KaaS 206 to determine when the CertS DP 208 completes revoking any replicated certificate, including subordinate certificates. The CertS worker 210 can create a revocation event based on the determining that the CertS DP 208 has completed revoking any replicated certificate. The KaaS 206 can further store the revocation event. The revocation event can be used as notice to cloud resources that a certificate has been revoked.

At some point, an API GW service 212 can receive a request from a customer, in which the API GW service 212 can verify the customer's identity to determine whether to satisfy the request. The API GW service 212 can poll the CertS DP 208 to determine if any revocation events have been added to the CertS DP 208. The CertS DP 208 can transmit a message to an identity service 214 to verify that the API GW service 212 is associated, via an association object, with a revoked certificate. The identity service 214 can either confirm or deny confirmation that the API GW service 212 is associated, via the association object, with a revoked certificate.

If the identity service 214 confirms that the API GW service 212 is associated with a revoked certificate, the CertS DP 208 can further allow the API GW 212 to read the revocation indication. The API GW service 212 can read that the certificate has been revoked and transmit an error message back to the customer 202.

In some embodiments, a resource, such as a LB service, can support transport layer security (TLS) or a mutual transport layer security (mTLS). Transport layer security (TLS) can include an encryption protocol for authenticating a network server in a client-server connection (e.g., one-way authentication), and further encrypting data transmitted between the client and the network server. Mutual transport layer security can include authentication of both client and the network server (e.g., two-way authentication). Each of these termination methods can rely on certificates, certificate authorities (CAs), or CA bundles for authentication of the client and/or the network server. An embodiment for a system for authorization using association between cloud resources while supporting transport layer security (TLS) or a mutual transport layer security (mTLS) is provided below.

Figure 3:
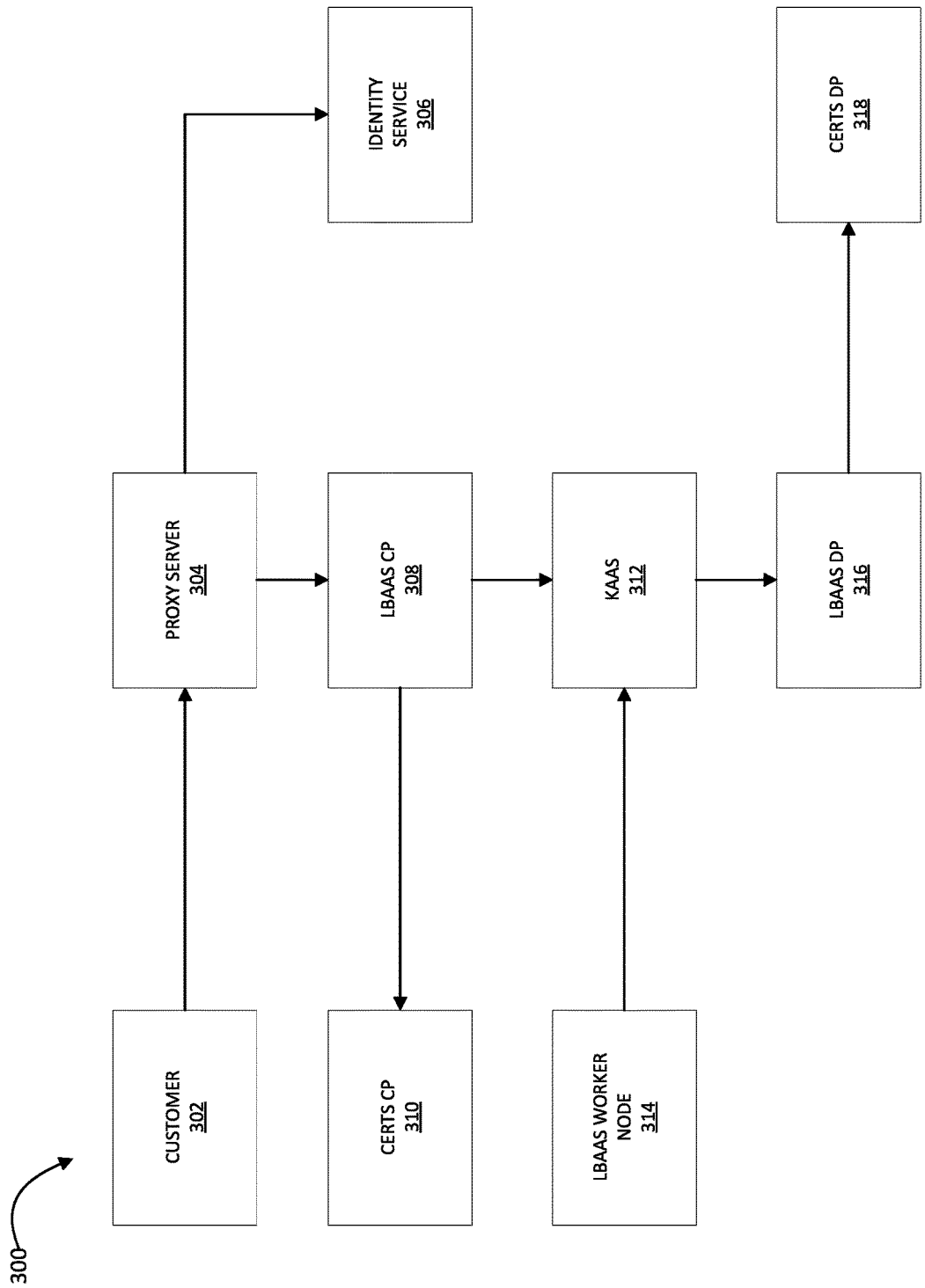
FIG. 3 is an illustration of a system for authorization using association between cloud resources, according to one or more embodiments.

FIG. 3 is an illustration 300 of a system for authorization using association between cloud resources, according to one or more embodiments. In particular, FIG. 3 can relate a system configured for transport layer security (TLS) or mutual transport layer security (mTLS), according to one or more embodiments. A customer 302 can transmit a request to create a load balancer instance to a proxy server 304. The proxy server 304 can be an intermediary server that provides a gateway between the customer 302 and a cloud computing network. The proxy server 304 can further support a support transport layer security (TLS) or a mutual transport layer security (mTLS) protocol. The customer's request can include a certificate identifier for a certificate that authorizes the customer to request the load balancer. It should be appreciated that the certificate and association creation process can also be initiated by an automated process. It should further be appreciated that although FIG. 3 uses a load balancer (LB) service as an example of a cloud resource, the concepts can be applied to various integrated cloud services (e.g., API GW service). The proxy server 304 can call an identity service 306 to authorize the customer's request to create the load balancer instance. The proxy server 304 can further provide a certificate identifier to the identity service 306. The identity service 306 can either authorize the request or deny authorization of the request. For example, the identity service 306 can use the certificate identifier to detect the certificate associated the customer, and in particular for a certificate for a load balancer service. The identity service 306, can read the certificate and verify that the customer making the request for a load balancer instance is the same customer as indicated by the certificate. If the identity service 306 verifies the identity of the proxy server 304, it can provide an indication to the proxy server 304 that request is authorized. If the identity service 306 cannot verify the identity of the proxy server 304, it can provide an indication to the proxy server 304 that the request is not authorized. If the identity of the customer 302 is not verified, the proxy server 304 can transmit an error message to the customer 302.

If the identity of the customer 302 is verified, the proxy server 304 can initiate a process to create a load balancer instance. The proxy server 304 can transmit the customer's request to a load balancer as a service control plane (LBaaS CP) 308. In response to receiving the forwarded request, the LBaaS CP 308 can call a certificate service control plane (CertS CP) 310 to verify that certificate exists (e.g., the certificate has not been revoked). The request can include the certificate identifier received by the proxy server 304 from the customer 302. The CertS CP 310 can either verify that the certificate exists or indicate that the certificate does not exist (e.g., the certificate has been revoked). For example, the CertS CP 310 can store one or more certificates associated with one or more customers. The CertS CP 310 can further use the certificate identifier to detect a certificate having the same certificate identifier. If the CertS CP 310 verifies that the certificate exists, the LBaaS CP 308 can further store a work request for creating the load balancer instance with a KaaS 312. If the CertS CP 308 cannot detect a certificate having a matching certificate identifier, the CertS CP 310 can transmit an error message to the LBaaS CP 308. In response to receiving verification that the certificate exists, an LBaaS worker node 314 can retrieve the work request from the KaaS 312 and create the load balancer instance.

The LBaaS worker node 314 can call the CertS CP 308 to create an association object that associates the certificate and a load balancer as a service (LBaaS). The CertS CP 308 can create the association object between the certificate and the LBaaS. Once the CertS CP 308 creates the association, the LBaaS worker node 314 can update the work request stored in the KaaS 312 to include directing an update of a LBaaS data plane (DP) 316 to include the association object.

For time to time, the customer 302 can request that another load balancer instance be created. To proceed with the request, a LBaaS can verify the identity of the customer 302. The LBaaS can contact the CertS CP 308 to access the certificate. Rather than check an identity service for a policy that indicates to LBaaS can access, a Certs DP can provide access to the certificate, based on the association object. As described above, the association object can be created regardless of whether the customer 302 loaded a policy onto the identity service 306. Rather the association is created by the CertS CP 308 based on the customer 302 initially requesting that the LBaaS create the load balancer instance.

Figure 4:
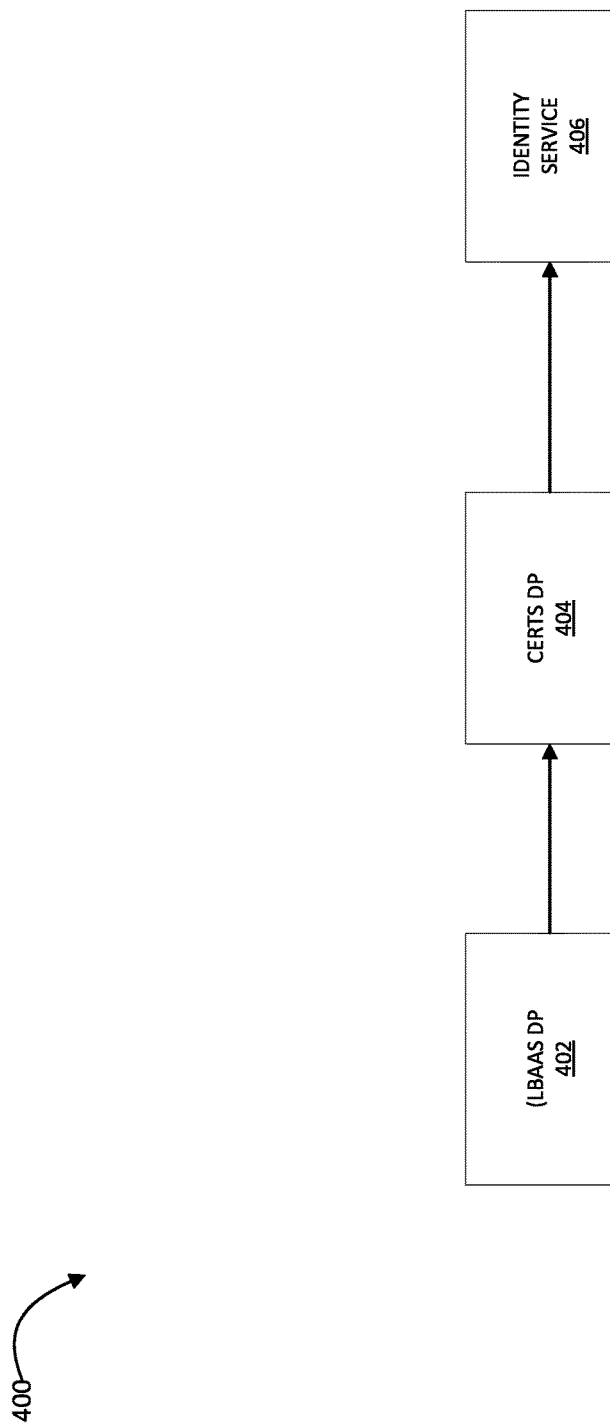
FIG. 4 is an illustration of a system for authorization using association between cloud resources, according to one or more embodiments.

FIG. 4 is an illustration 400 of a system for authorization using association between cloud resources, according to one or more embodiments. In particular, FIG. 4 relates to a system for certificate renewal or revocation, according to one or more embodiments. FIG. 4 anticipates an automated process for revocation or renewal. However, it should be appreciated that the certificate revocation or renewal process can also be initiated by a manual input from a customer. It should further be appreciated that although FIG. 4 uses a load balancer (LB) as an example of a cloud resource, the concepts can be applied to various integrated cloud services (e.g., API GW service). An LBaaS DP 402 can poll a CertS DP 404 to determine if any new events have been added to the CertS DP 404. The event can be, for example, a revocation event or a renewal event. For example, with respect to a renewed certificate, the LBaaS DP 402 can detect a change to the sequence number of the last known event. The CertS DP 404 can transmit a message to an identity service 406 to verify the identity of the LBaaS DP 402. The CertS DP 404 can further allow the LBaaS DP 402 to read the certificate. Based on the change in the sequence number, the LBaaS DP 402 can detect that the CertS DP 404 is storing a new certificate that is associated with the LBaaS DP 402. Based on the detection, the LBaaS DP 402 can request to replicate the renewed certificate. In some embodiments, the LBaaS DP 402 makes the request to replicate the certificate. The CertS DP 404 can call an identity service 406 to authorize the request from the LBaaS DP 402. The identity service 406 can verify the identity of the LBaaS DP 402. If the LBaaS DP 402 identity is verified, then the identity service 406 can authorize granting the request the replication of the certificate and association. If the LBaaS DP 402 identity is not verified, then the identity service 406 can deny authorizing the request the replication of the certificate and association.

Figure 5:
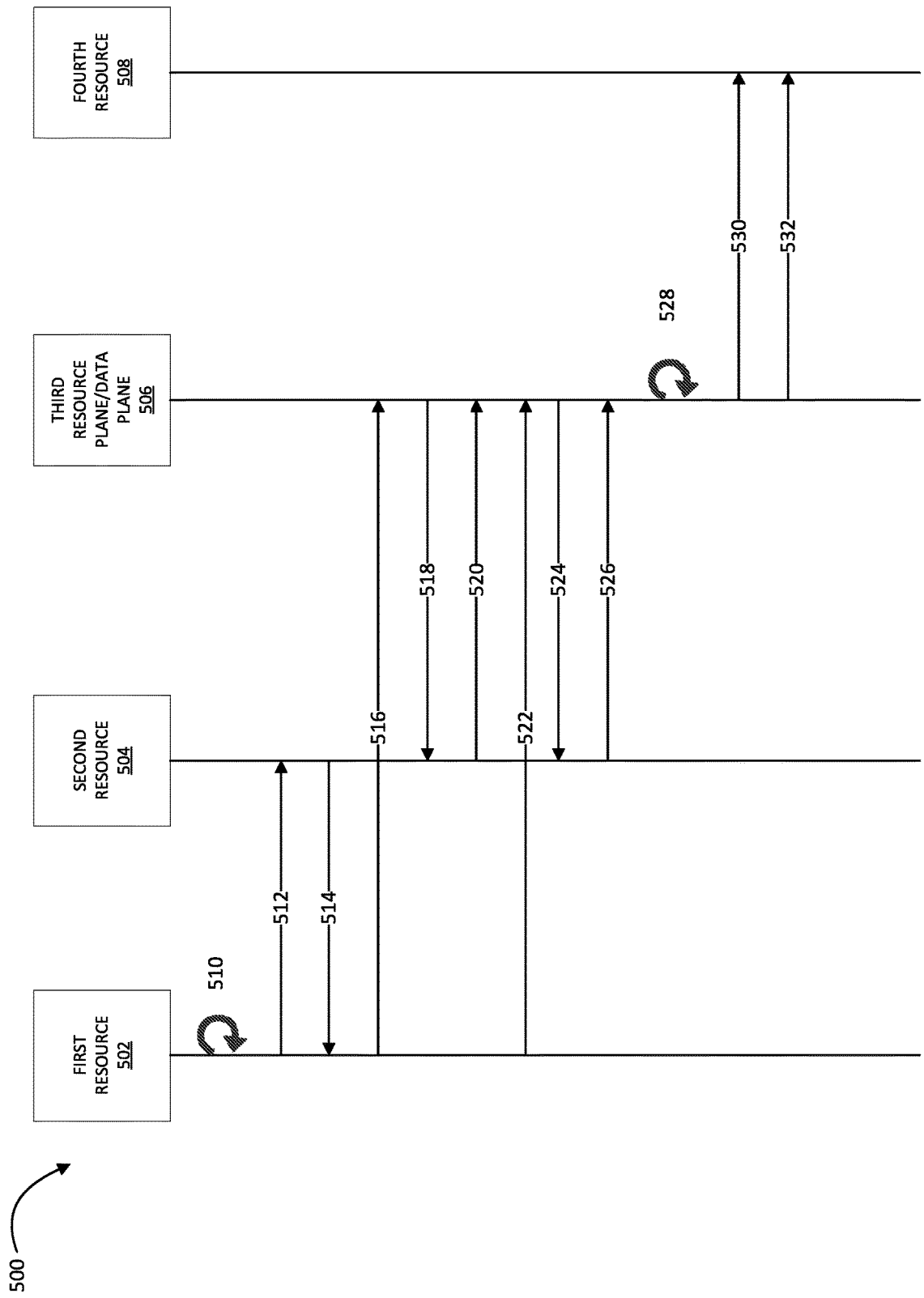
FIG. 5 is a signaling diagram for authorization using association between cloud resources, according to one or more embodiments.

FIG. 5 is a signaling diagram 500 for authorization using association between cloud resources, according to one or more embodiments. As illustrated, a first resource 502 (LB service or API GW service) can be in communication with a second resource 504 (e.g., identity service), a third resource 506 (e.g., certificate service), and a fourth resource 508 (e.g., key service). While the operations of processes 500, 600, 700, and 800 are described as being performed by generic computers, it should be understood that any suitable device (e.g., a user device, a server device) may be used to perform one or more operations of these processes. Processes 500, 600, 700, and 800 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 510 a first resource 502 can receive a request to perform an action. The first resource can be any integrated resource (e.g., an LB service or an API GW service) and the request can include, for example, creating a load balancer instance or creating an API GW instance. The request can further include a certificate identifier for identifying a certificate that authorizes the request. The requests can be received by the first resource 502 from a customer or an automated process. The action can be an action that requires the customer's identity to be verified.

At 512, the first resource 502 can transmit a request to a second resource 504 to request authorization for performing the action. The second resource 504 can be a service that verifies user identities to access to resources, such as files, applications, and services.

At 514, the second resource 504 can transmit a response to the first resource 502. The response can either be a grant or denial of authorization for the request. In some instances, the identity service can grant authorization to the first resource 502 and transmit a response that includes a token to perform the action. In other instances, the second resource 504 can deny authorization to the first resource 502 and transmit a denial. The decision as to whether to grant or deny authorization can be based on various parameters, verification of the first resource's identity, system performance metrics, available tokens, or other appropriate metrics. If the first resource 502 receives a denial of authorization, the first resource 502 can transmit an error message to the requestor.

For the purposes of FIG. 5, it can be assumed that the first resource 502 receives authorization to perform the action. At 516, the first resource 502 can also transmit a message to the third resource 506 to request to access the certificate (e.g., read the certificate) that can verify whether the customer is authorized to request the action against the certificate and/or whether any such certificate exists (e.g., the certificate has not been previously revoked). The message can include the token received from the second resource 504. In particular, the first resource 502 can transmit the message to a control plane of the third resource 506.

At 518, the third resource 506 can transmit a request to the second resource 504 as to whether to authorize or deny the first resource's request to access the certificate. The request can further include the token transmitted from the second resource 504 to the first resource 502. The second resource 504 can make the determination as to authorization or denial based on the identity of the customer and the token. At 520, the second resource 504 can transmit a response to the third resource 506. For the purposes of FIG. 5, it can be assumed that the second resource 504 grants authorization to access the certificate.

At 522, the first resource 502 can access the certificate stored by the third resource 506. The first resource 502 can further verify that the certificate exists. Based on the verification, the first resource 502 can further request that third resource 506 create an association object that associates the certificate and the first resource 502. As described above, the association can be an object that connects the certificate with the first resource 502.

At 524, the third resource 506 can transmit a message to the identity service to request permission to create the object. At 526 the second resource 504 can transmit a response to the certificate service. The response can include an authorization to create the association object or a denial of an authorization to create association object. The second resource 504 can determine whether to authorize or deny authorization to create the association object based on the certificate identifier being associated with the token.

At 528, the third resource 506 can create the association object. The association object can associate the certificate and the first resource 502. As described above, the association object can permit the third resource 506 to allow the first resource to access the certificate without having to have the second resource 504 review a policy as whether the third resource 506 can access the certificate. At 530, the certificate service can store the association object at the fourth resource 508.

At 532, the certificate service can read the association object stored at the fourth resource 508 and replicate the association object. In particular, a certificate service data plane can replicate and store the association object.

Therefore, if the first resource 502 needs to read the certificate (e.g., based on a new request), the first resource 502 can request to access the certificate from the third resource 506. Rather than contacting the identity service to determine whether the first resource can access the certificate, the third resource 506 can grant access to the certificate, based on the association.

Figure 6:
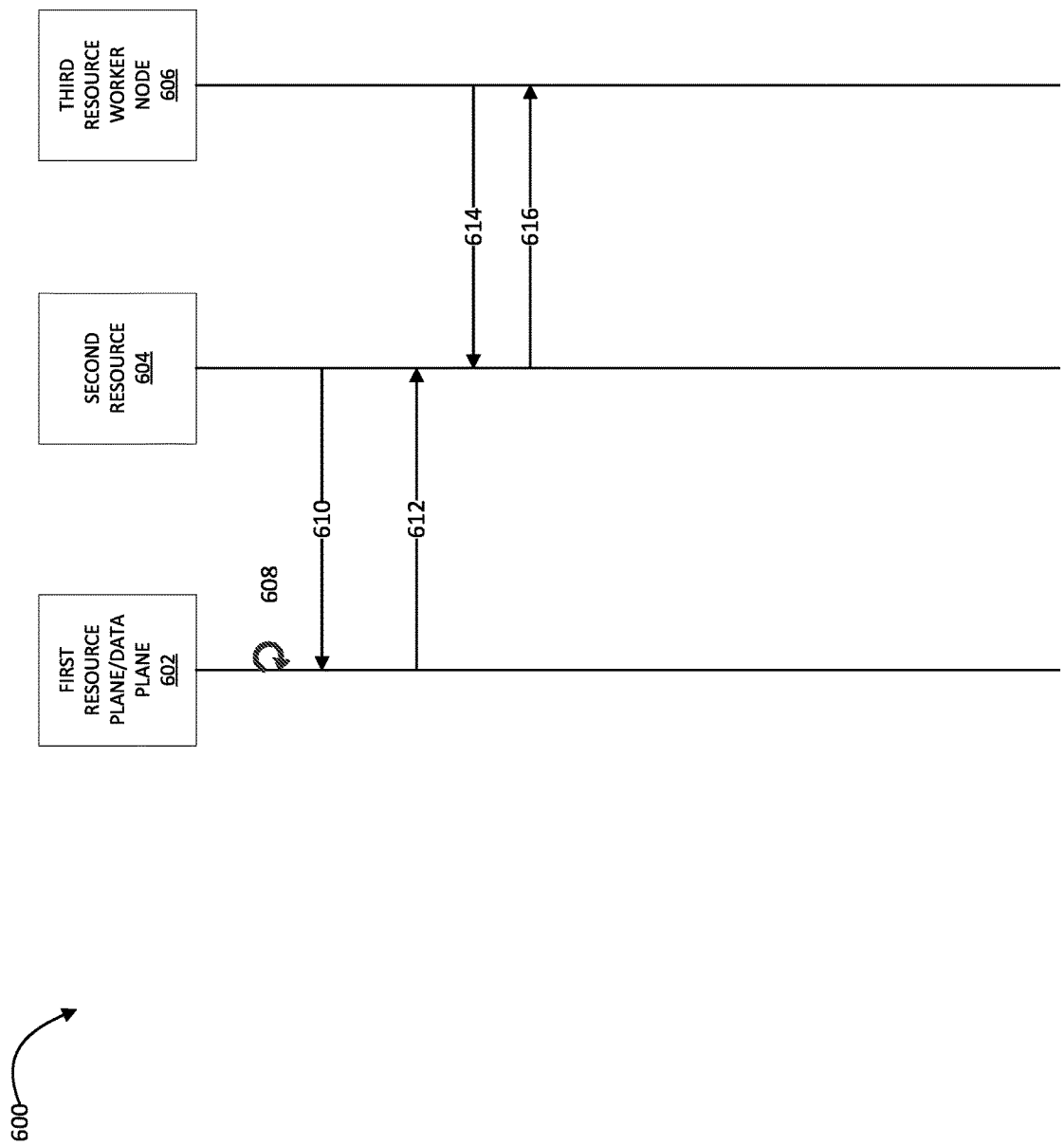
FIG. 6 is a signaling diagram for certificate renewal, according to one or more embodiments.

FIG. 6 is a signaling diagram 600 for certificate renewal, according to one or more embodiments. As illustrated, a first resource 602 (e.g., certificate service) can be in communication with a second resource 604 (e.g., key service), and a third resource worker node 606 (e.g., certificate service worker node). At 608, the first resource 602 can receive the request to renew a certificate. The request can be based on manual input from a customer or from an automated process. The first resource 602 can further create a renewed certificate, based on the request. In particular, a control plane of the first resource 602 can receive the request and create the renewed certificate.

At 610, the second resource 604 can read the renewed certificate, replicate the renewed certificate, and store the renewed certificate. The second resource 604 can further associate the renewed certificate with an association object, wherein the association object can associate a first resource with the renewed certificate.

At 612, the first resource 602 can read the renewed certificate and association object in the second resource 604 to replicate and store the renewed certificate and association object. In particular, the data plane of the first resource 602, can read the renewed certificate and association object in the second resource 604 to replicate and store the renewed certificate and association object.

At 614, the third resource worker node 606 can monitor the second resource 604 to determine when the first resource 602 completes replicating the renewed certificate and association object. The third resource worker node 606 can create a renewal event based on the determining that the first resource 602 has completed replicating the certificate and the association object.

At 616, the second resource 604 can read and write the renewal event from the third resource worker node 606.

Figure 7:
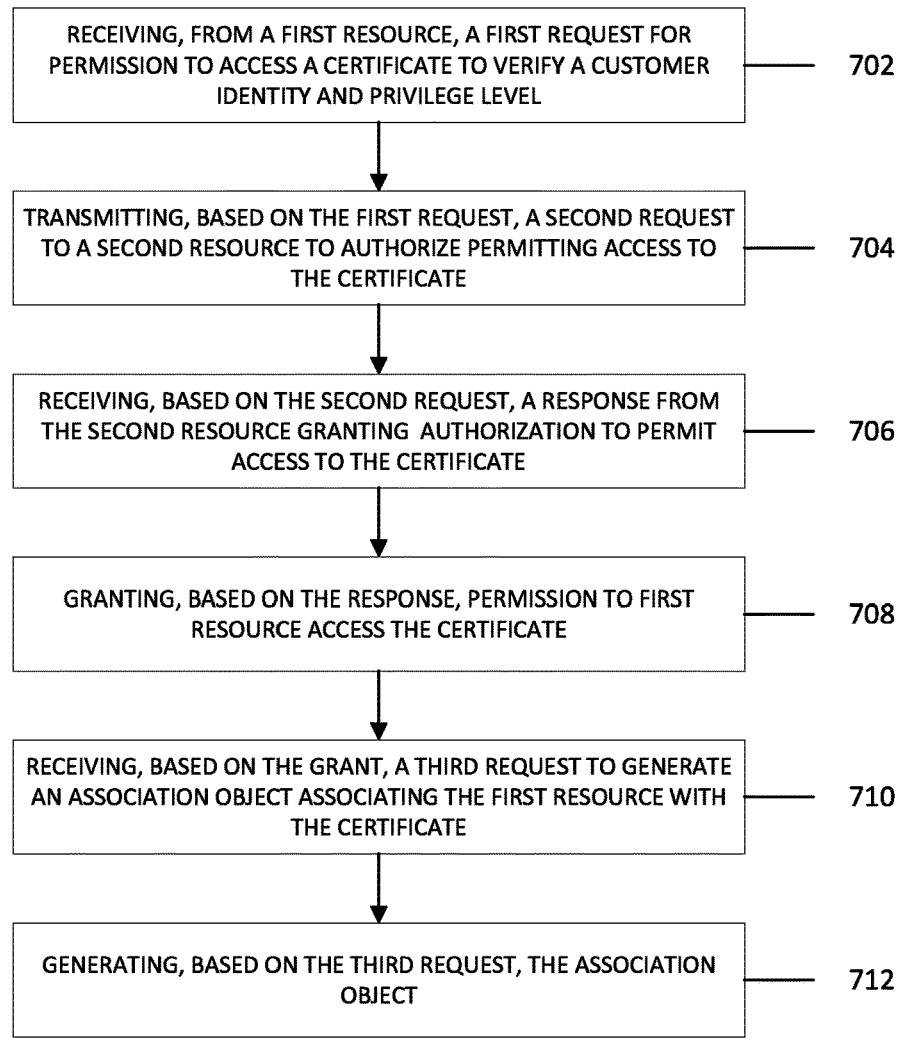
FIG. 7 is a process flow for authorization using association between cloud resources, according to one or more embodiments.

FIG. 7 is a process flow 700 for authorization using association between cloud resources, according to one or more embodiments. At 702, the method can include a computing device receiving a first request for permission to access a certificate to verify a customer identity. The request can include a certificate identifier for identifying the requested certificate and token. The certificate can have been provided to the first resource from a customer requesting an operation to be performed by the first resource. The token can have been provided to the first resource by a second resource such as an identity service.

The computing device can implement a resource (e.g., certificate service) of a cloud computing network. For example, the first resource can be a service such a workflow service requesting to initiate a workflow instance to process a job. In some instances, a customer can have created the certificate using the certificate service and the certificate can have stored the certificate on behalf of the customer. The first resource can make the first request based on the customer transmitting a request to the resource. For example, the customer can transmit a job request to the workflow service, and the workflow service needs to satisfy the request by initiating a workflow.

At 704, the method can include the computing device transmitting a second request to a second resource to authorize permitting access to the certificate. The second resource can be another cloud service such as an identity service. The second request can include the token received from the first resource. The token can be token originally provided to the first resource by the second resource. The second resource can authorize the computing device to permit the first resource to access the certificate, based on the token received from the computing device matching the token transmitted to the first resource.

At 706, the method can include computing device receiving, from the second resource, a response granting authorization to permit the first resource to access the certificate. As described above, the second resource can compare the token received from the computing device and the token transmitted to the first resource. The second resource can further grant authorization to permit the computing device to allow the first resource to access the certificate, based on the token received from the computing device matching the token transmitted to the first resource.

At 708, the method can include the computing device granting the first resource permission to access the certificate. The first resource can read the certificate including any subordinate certificates to verify the customer's identity to make the request.

At 710, the method can include the computing device receiving a third request to generate an association object associating the first resource with the certificate. The association object can be an object (e.g., second level object) that connects a certificate service object (e.g., top level object such as a certificate authority, certificate authority bundle, or certificate) with the first resource. The association object can allow the computing device to allow a resource, such as the first resource, to access a certificate without having to request an identity service grant permission based on a customer created policy. The receipt of the third request can be based on the granting of the permission to access the certificate. The first resource can access the certificate and verify that the request from the customer is valid. The first resource can then transmit the third request to generate the association object.

At 712, the method can include the computing device generating the association object. The association object can further be stored by the computing device. Therefore, if at some point in time, the computing device receives another request from the first resource to access the certificate, the computing device can rely on the association object to grant permissions, rather than relying on a customer created policy.

Figure 8:
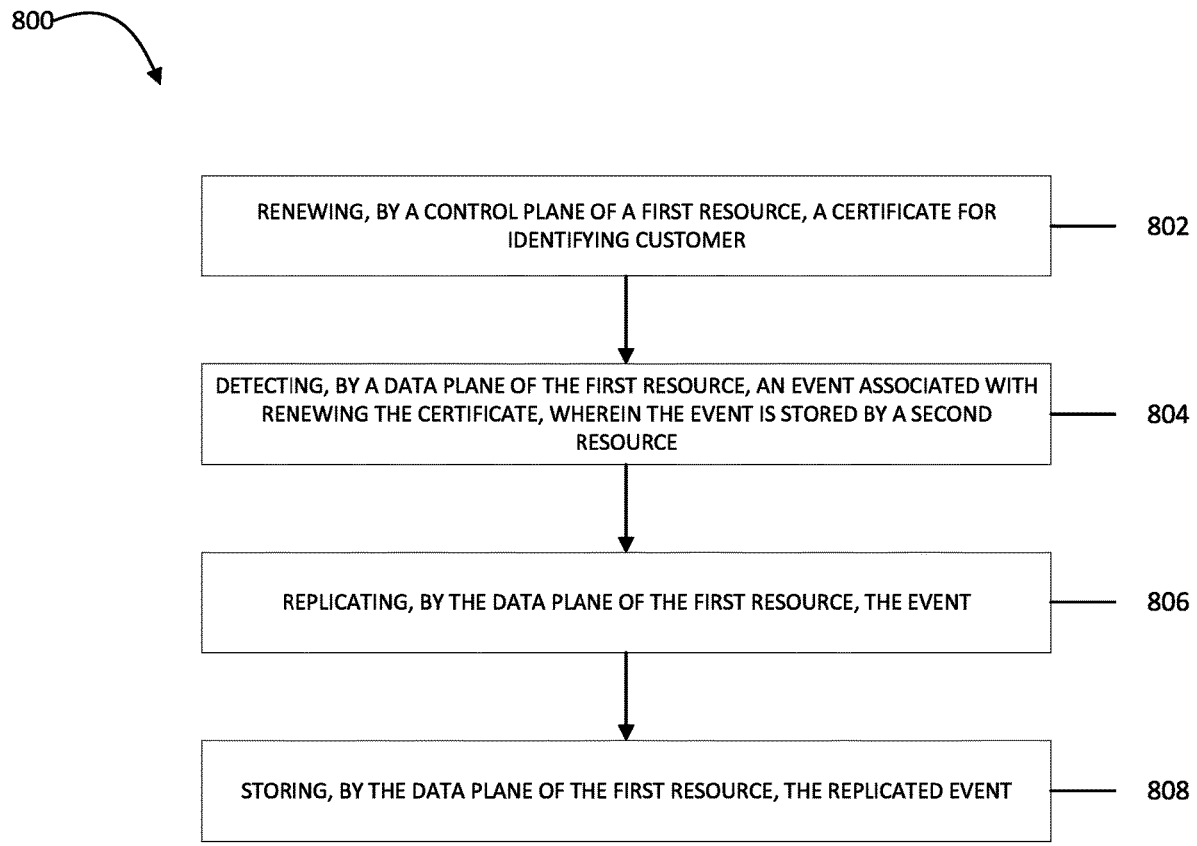
FIG. 8 is a process flow for authorization using association between cloud resources, according to one or more embodiments.

FIG. 8 is a process flow 800 for authorization using association between cloud resources, according to one or more embodiments. In particular, FIG. 8 relates to event creation associated with certificate renewal, according to one or more embodiments. At 802, the method can include renewing a certificate for identifying a customer, including any subordinate certificates. The renewal can be performed by a computing device, such as a device implementing a first resource, such as a certificate service. In particular, the renewal can be performed by a control plane of the first resource. The renewal can be based on a manual input from a customer associated with the certificate or based on an automated process. For example, the expiry time of the certificate can be approaching, and the renewal can be to extend the life of the certificate.

At 804, the method can include detecting an event associated with renewing the certificate. The event can be a data structure providing an indication that the certificate has been renewed. The event can be created by a second resource, such as a key service. In some embodiments, the second resource, creates the event upon detecting that the data plane of the first resource has replicated the renewed certificate.

At 806, the method can include the computing device replicating the event. In some instances, the event can be replicated by the data plane of the first resource. Each event can further be associated with a sequence number for identifying the event, where each sequence number has an incrementally increasing value from a previous certificate (e.g., the certificate that has been renewed). For example, if an event has a sequence number of 0000, a subsequent renewal event can have a sequence number of 0001. Therefore, a cloud resource can read the event sequence number and compare the number to a last known number for a certificate to determine whether the certificate is a renewed certificate.

At 808, the method can include the computing device storing the replicated event. The event can be stored in a database along with other events indicating certificate renewal. Therefore, a third resource, (e.g., an LB service, an API GW service, a job scheduler service) can request to view each event stored in the database. If the third resource, using the sequence numbers, detects an event related to a certificate that it is associated with, the third resource can request to view the certificate. The computing device can further agree to allow the third resource to view the certificate, based on an association object that associates the third resource and the certificate.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 9:
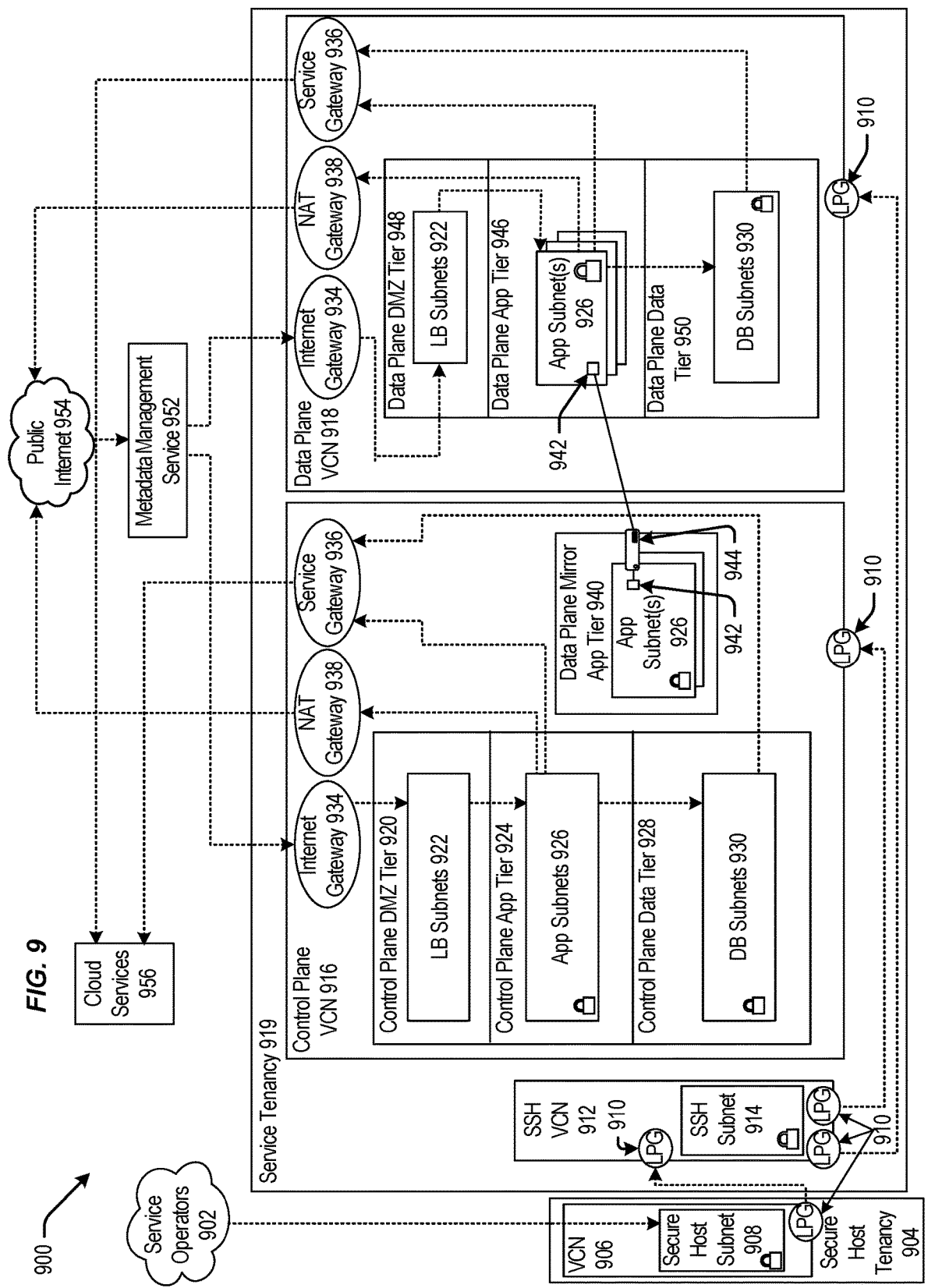
FIG. 9 is a block diagram illustrating a pattern for implementing a cloud infrastructure as a service system, according to one or more embodiments.

FIG. 9 is a block diagram 900 illustrating an example pattern of an IaaS architecture, according to one or more embodiments. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
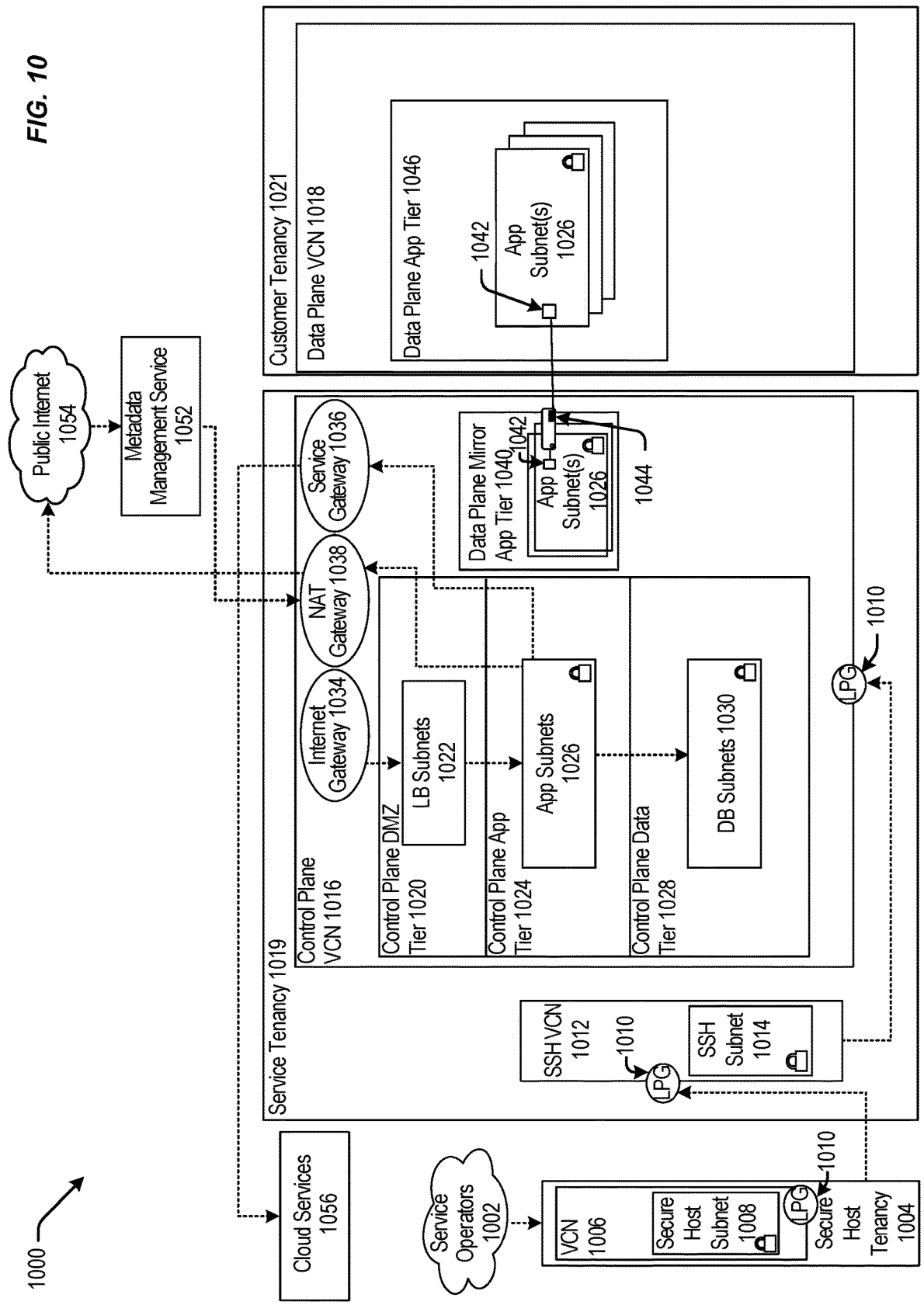
FIG. 10 is a block diagram illustrating another pattern for implementing a cloud infrastructure as a service system, according to one or more embodiments.

FIG. 10 is a block diagram 1000 illustrating another example pattern of an IaaS architecture, according to one or more embodiments. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1076 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 1010 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942 of FIG. 9) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 1046 of FIG. 10) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 902 of FIG. 9) that can be communicatively coupled to public Internet 1054 (e.g., public Internet 904 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 1," may be located in Region 1 and in "Region 2." If a call to Deployment 1 is made by the service gateway 1036 contained in the control plane VCN 1016 located in Region 1, the call may be transmitted to Deployment 1 in Region 1. In this example, the control plane VCN 1016, or Deployment 1 in Region 1, may not be communicatively coupled to, or otherwise in communication with, Deployment 2 in Region 2.

Figure 11:
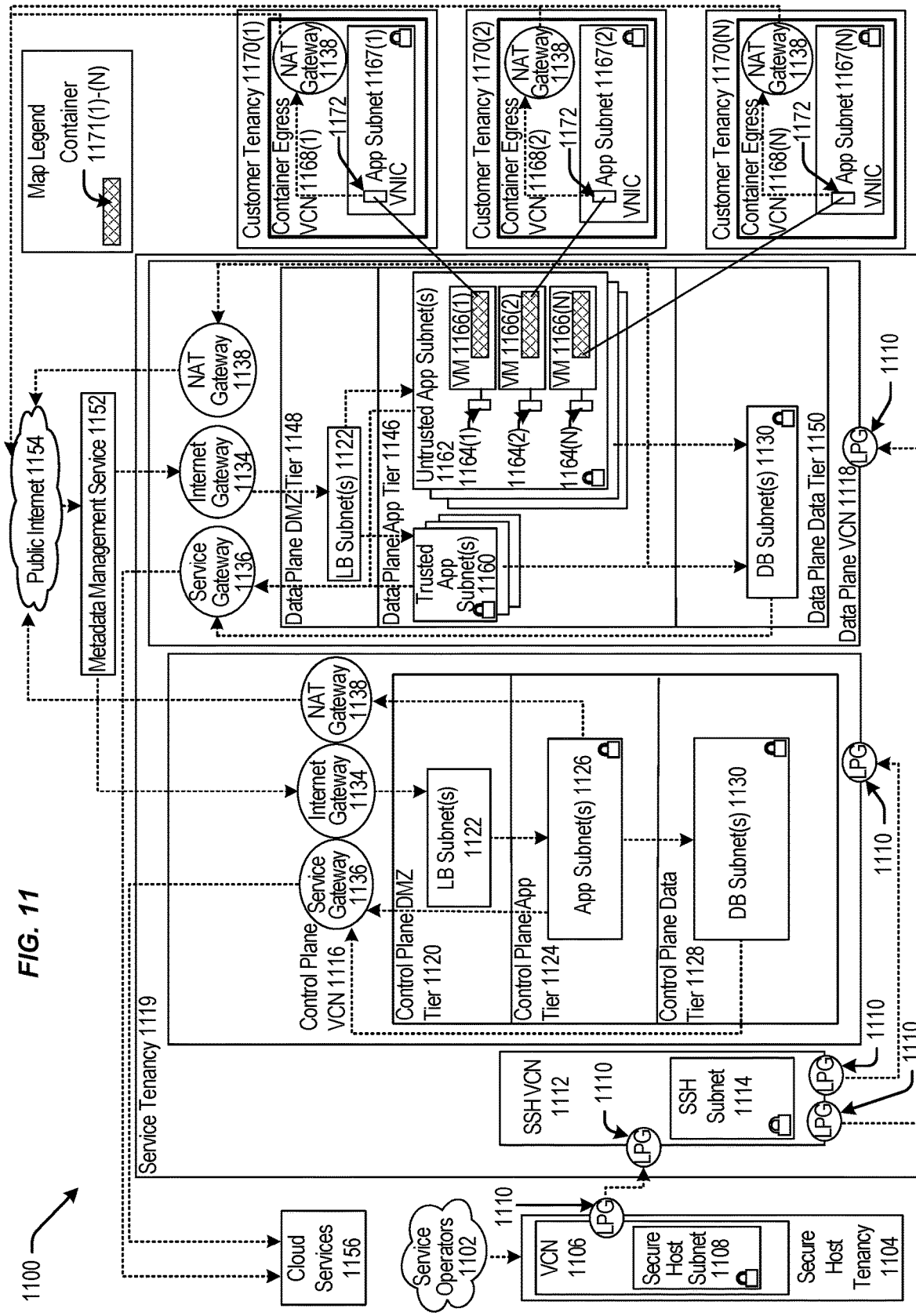
FIG. 11 is a block diagram illustrating another pattern for implementing a cloud infrastructure as a service system, according to one or more embodiments.

FIG. 11 is a block diagram 1100 illustrating another example pattern of an IaaS architecture, according to one or more embodiments. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 1106 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway 936 of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9). The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
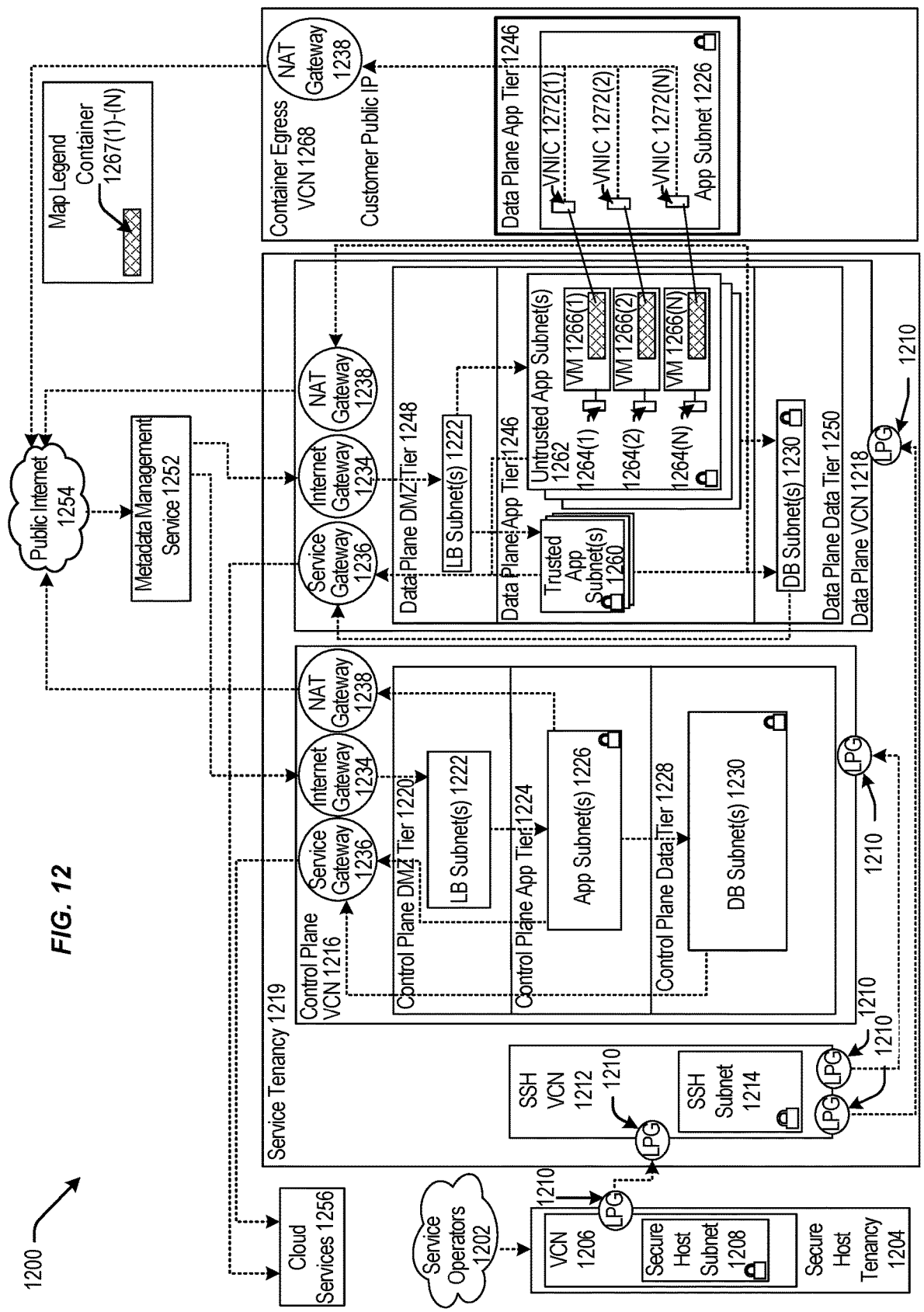
FIG. 12 is a block diagram illustrating another pattern for implementing a cloud infrastructure as a service system, according to one or more embodiments.

FIG. 12 is a block diagram 1200 illustrating another example pattern of an IaaS architecture, according to one or more embodiments. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 930 of FIG. 9). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway 936 of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
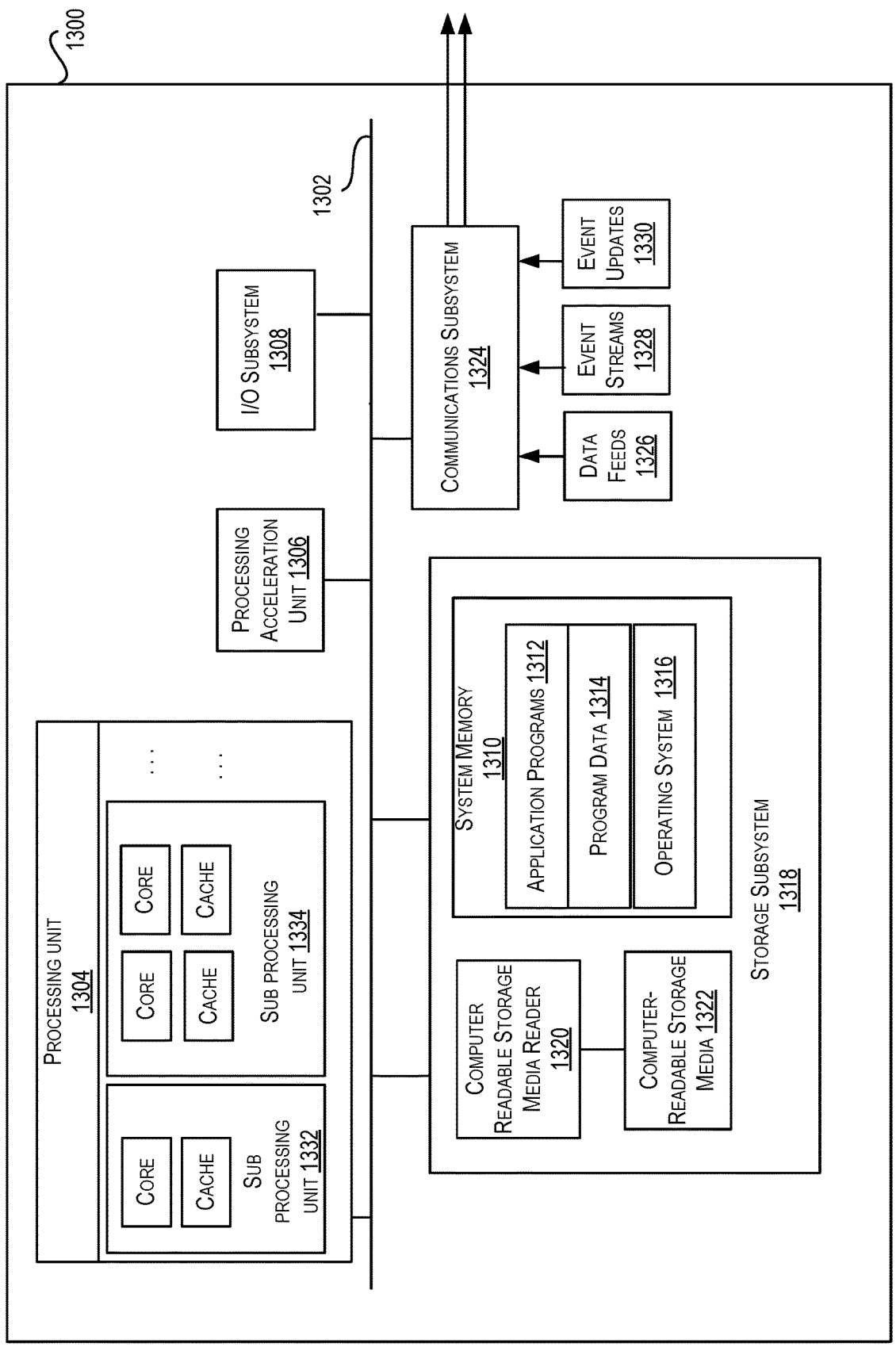
FIG. 13 is a block diagram illustrating an example computer system, according to at according to one or more embodiments.

FIG. 13 illustrates an example computer system 1300, in which various embodiments may be implemented, according to one or more embodiments. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs. Storage subsystem 1318 may also that provides a tangible non-transitory computer-readable storage medium for storing software the basic programming and data constructs that provide the functionality of some of the embodiments described in this disclosure. The software can include Software (programs, code modules, instructions), scripts, etc., that when executed by one or more a cores or processors of processing unit 1304 provide the functionality described above may be stored in storage subsystem 1318. These software modules or instructions may be executed by processing unit 1304. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. that comprises software elements, shown as being currently located within a system memory 1310. System memory 1310 may store program instructions that are loadable and executable on by processing unit 1304. System memory 1310, as well as may also store data that is used during the execution of the instructions and/or data that is generated during the execution of the se program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem %524 can include radio frequency (RF) transceiver components for accessing wireless voice and/or data networks (e.g., using cellular telephone technology, advanced data network technology, such as 3G, 4G or EDGE (enhanced data rates for global evolution)), WiFi (IEEE 302.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing device and from a first resource, a first request for permission to access a certificate to verify a requestor's identity;
   transmitting, by the computing device and based at least in part on the first request, a second request to a second resource to authorize permitting access to the certificate;
   receiving, by the computing device and based at least in part on the second request, a response from the second resource comprising an authorization to permit access to the certificate;
   granting, by the computing device and based at least in part on the response, permission to the first resource to access the certificate, wherein the first resource is configured to verify the requestor's identity based on accessing the certificate;
   receiving, by the computing device and based at least in part on the grant, a third request from the first resource to generate an association object between the first resource and the certificate; and
   generating, by the computing device and based at least in part on the third request, the association object, wherein the association object associates the first resource and the certificate.

2. The method of claim 1, wherein the first request comprises a token from the first resource, wherein transmitting the second request comprises transmitting the token to the second resource, wherein the first resource is configured to receive the token from the second resource, and wherein the authorization to permit access to the certificate is based at least in part on the token.

3. The method of claim 1, wherein the method further comprises:
   receiving, from the first resource, a fourth request to access the certificate; and
   granting access to the certificate, based at least in part on the association object associating the first resource and the certificate.

4. The method of claim 1, wherein the certificate is a renewed certificate, and wherein the method further comprises:
   detecting an event stored at a third resource, wherein the event is a data structure associated with the renewed certificate;
   replicating the event based at least in part on the detecting the event stored at the third resource;
   storing the event associated with the certificate at a database associated with the computing device.

5. The method of claim 1, wherein the first request is received via a transport layer security (TLS) protocol or a mutual transport layer security protocol (mTLS), and wherein the method further comprises validating that the certificate exists.

6. The method of claim 1, wherein the computing device implements a certificate service, and the second resource is an identity service.

7. The method of claim 1, wherein the certificate is created by the computing device.

8. A computing device, comprising:
   one or more processors; and
   one or more non-transitory, computer-readable media comprising instructions that, when executed, cause the one or more processors to perform operations comprising:
   receiving, from a first resource, a first request for permission to access a certificate to verify a requestor's identity;
   transmitting, based at least in part on the first request, a second request to a second resource to authorize permitting access to the certificate;
   receiving, based at least in part on the second request, a response from the second resource comprising an authorization to permit access to the certificate;
   granting, based at least in part on the response, permission to the first resource to access the certificate, wherein the first resource is configured to verify the requestor's identity based on accessing the certificate;

receiving, based at least in part on the grant, a third request from the first resource to generate an association object between the first resource and the certificate; and generating, based at least in part on the third request, the association object, wherein the association object associates the first resource and the certificate.

9. The computing device of claim 8, wherein the first request comprises a token from the first resource, wherein transmitting the second request comprises transmitting the token to the second resource, wherein the first resource is configured to receive the token from the second resource, and wherein the authorization to permit access to the certificate is based at least in part on the token.

10. The computing device of claim 8, wherein the instructions that, when executed, further cause the one or more processors to perform operations comprising:
receiving, from the first resource, a fourth request to access the certificate; and
granting access to the certificate, based at least in part on the association object associating the first resource and the certificate.

11. The computing device of claim 8, wherein the certificate is a renewed certificate, and wherein the instructions that, when executed, further cause the one or more processors to perform operations comprising:
detecting an event stored at a third resource, wherein the event is a data structure associated with the renewed certificate;
replicating the event based at least in part on the detecting the event stored at the third resource; and
storing the event associated with the certificate at a database associated with the computing device.

12. The computing device of claim 8, wherein the first request is received via a transport layer security (TLS) protocol or a mutual transport layer security protocol (mTLS) and wherein the instructions that, when executed, further cause the one or more processors to perform operations comprising validating that the certificate exists.

13. The computing device of claim 8, wherein the computing device implements a certificate service, and the second resource is an identity service.

14. The computing device of claim 8, wherein the certificate is created by the computing device.

15. One or more non-transitory computer-readable media including stored thereon a sequence of instructions that, when executed, one or more processors to perform operations comprising:
receiving, from a first resource, a first request for permission to access a certificate to verify a requestor's identity;
transmitting, based at least in part on the first request, a second request to a second resource to authorize permitting access to the certificate;
receiving, based at least in part on the second request, a response from the second resource comprising an authorization to permit access to the certificate;
granting, based at least in part on the response, permission to the first resource to access the certificate, wherein the first resource is configured to verify the requestor's identity based on accessing the certificate;
receiving, based at least in part on the grant, a third request from the first resource to generate an association object between the first resource and the certificate; and
generating, based at least in part on the third request, the association object, wherein the association object associates the first resource and the certificate.

16. The one or more non-transitory computer-readable media of claim 15, wherein the first request comprises a token from the first resource, wherein transmitting the second request comprises transmitting the token to the second resource, wherein the first resource is configured to receive the token from the second resource, and wherein the authorization to permit access to the certificate is based at least in part on the token.

17. The one or more non-transitory computer-readable media of claim 15, wherein the sequence of instructions that, when executed, further cause the one or more processors to perform operations comprising:
receiving, from the first resource, a fourth request to access the certificate; and
granting access to the certificate, based at least in part on the association object associating the first resource and the certificate.

18. The one or more non-transitory computer-readable media of claim 15, wherein the certificate is a renewed certificate, and wherein the sequence of instructions that, when executed, further cause the one or more processors to perform operations comprising:
detecting an event stored at a third resource, wherein the event is a data structure associated with the renewed certificate;
replicating the event based at least in part on the detecting the event stored at the third resource; and
storing the event associated with the certificate at a database.

19. The one or more non-transitory computer-readable media of claim 15, wherein the first request is received via a transport layer security (TLS) protocol or a mutual transport layer security protocol (mTLS) and wherein the sequence of instructions that, when executed, further cause the one or more processors to perform operations comprising validating that the certificate exists.

20. The one or more non-transitory computer-readable media of claim 15, wherein the second resource is an identity service.

* * * * *